United States Patent
Benson et al.

(10) Patent No.: US 10,668,401 B2
(45) Date of Patent: Jun. 2, 2020

(54) EXTRACTOR WITH SETTLING ZONE NEAR SOLVENT DISCHARGE

(71) Applicant: Crown Iron Works Company, Roseville, MN (US)

(72) Inventors: James Benson, Stillwater, MN (US); George E. Anderson, Champlin, MN (US); Philip Fisher, Ham Lake, MN (US); Richard Ozer, Golden Valley, MN (US)

(73) Assignee: Crown Iron Works Company, Blaine, MN (US)

( * ) Notice: Subject to any disclaimer, the term of this patent is extended or adjusted under 35 U.S.C. 154(b) by 53 days.

(21) Appl. No.: 15/750,631

(22) PCT Filed: Aug. 5, 2016

(86) PCT No.: PCT/US2016/045892
§ 371 (c)(1),
(2) Date: Feb. 6, 2018

(87) PCT Pub. No.: WO2017/027416
PCT Pub. Date: Feb. 16, 2017

(65) Prior Publication Data
US 2018/0296939 A1     Oct. 18, 2018

Related U.S. Application Data

(60) Provisional application No. 62/202,485, filed on Aug. 7, 2015.

(51) Int. Cl.
*B01D 11/02* (2006.01)
*C11B 1/10* (2006.01)

(52) U.S. Cl.
CPC ........ *B01D 11/023* (2013.01); *B01D 11/0284* (2013.01); *C11B 1/10* (2013.01)

(58) Field of Classification Search
CPC ...... B01D 11/023; B01D 11/0284; C11B 1/10
See application file for complete search history.

(56) References Cited

U.S. PATENT DOCUMENTS

| 4,375,264 A | 3/1983 | Porter |
| 4,751,060 A | 6/1988 | Kratochwill |

(Continued)

FOREIGN PATENT DOCUMENTS

| CN | 102851113 A | 1/2013 |
| CN | 203060886 U | 7/2013 |

(Continued)

OTHER PUBLICATIONS

White Provisional for inspection 2014 (Year: 2014).*

(Continued)

*Primary Examiner* — Sean E Conley
*Assistant Examiner* — Brendan A Hensel
(74) *Attorney, Agent, or Firm* — Fredrikson & Byron, P.A.

(57) ABSTRACT

An extractor may have a housing that maintains a solvent pool in which solids material being processed is immersed during operation. One or more bed decks can be positioned inside of the housing to provide multiple extraction stages. In some examples, the bed decks are arranged to provide one bed deck positioned at a vertically elevated position relative to another bed deck, thereby providing a drop zone where the solids material passing through the machine drops from the vertically elevated bed deck to a lower bed deck. To reduce the amount of solids material passing through the drop zone that becomes entrained in the solvent, the exactor can be configured with a settling zone. In some examples, the settling zone is formed by truncating the length of the (Continued)

vertically elevated bed deck, providing increased space and residence time for the solids material to fall out of suspension.

11 Claims, 2 Drawing Sheets

(56) References Cited

U.S. PATENT DOCUMENTS

| | | | |
|---|---|---|---|
| 5,408,924 | A | 4/1995 | Arendt et al. |
| 5,591,416 | A | 1/1997 | Kemper et al. |
| 5,770,082 | A | 6/1998 | Anderson |
| 5,891,433 | A * | 4/1999 | Silver ............... B01D 11/0219 422/261 |
| 10,245,526 | B2 * | 4/2019 | White ............... B01D 11/023 |
| 2014/0193303 | A1 | 7/2014 | Ellis et al. |

FOREIGN PATENT DOCUMENTS

| | | |
|---|---|---|
| CN | 104474735 A | 4/2015 |
| WO | 2005100518 A1 | 10/2005 |
| WO | 2006102685 A1 | 9/2006 |
| WO | 2009041929 A1 | 4/2009 |
| WO | 2010059919 A2 | 5/2010 |
| WO | 2013159024 A1 | 10/2013 |
| WO | 2015179530 A1 | 11/2015 |
| WO | 2017027381 A1 | 2/2017 |
| WO | 2017027415 A1 | 2/2017 |
| WO | 2017035012 A1 | 3/2017 |

OTHER PUBLICATIONS

International Patent Application No. PCT/US2016/045785, International Search Report and Written Opinion dated Oct. 26, 2016, 15 pages.

International Patent Application No. PCT/US2016/045892, International Search Report and Written Opinion dated Nov. 1, 2016, 13 pages.

International Patent Application No. PCT/US2016/045889, International Search Report and Written Opinion dated Oct. 26, 2016, 13 pages.

* cited by examiner

EXTRACTOR WITH SETTLING ZONE NEAR SOLVENT DISCHARGE

RELATED APPLICATIONS

This application is a 35 U.S.C. 371 national stage filing from International Application No. PCT/US2016/045892, filed Aug. 5, 2016, which claims priority to US Provisional Application No. 62/202,485, filed Aug. 7, 2015. The entire contents of both these applications are incorporated herein by reference.

TECHNICAL FIELD

This disclosure relates to solvent extraction and, more particularly, to liquid-solvent extractors.

BACKGROUND

A variety of different industries use extractors to extract and recover liquid substances entrained within solids. For example, producers of oil from renewable organic sources use extractors to extract oil from oleaginous matter, such as soybeans, rapeseed, sunflower seed, peanuts, cottonseed, palm kernels, and corn germ. The oleaginous matter is contacted with an organic solvent within the extractor, causing the oil to be extracted from a surrounding cellular structure into the organic solvent. As another example, extractors are used to recover asphalt from shingles and other petroleum-based waste materials. Typically, the petroleum-based material is ground into small particles and then passed through an extractor to extract the asphalt from the solid material into a surrounding organic solvent.

Regardless of the application in which an extractor is used, manufacturers and operators of extractors are continuously looking for ways to improve the economic efficiency of their extractor operation. This can involve controlling the extractor to maximize the amount of extract recovered from a given feedstock while minimizing the amount of solvent lost during extraction and recovery. This can also involve operating the extractor harder by increasing the feedstock flow rate through the extractor. Unfortunately, attempts to increase feedstock flow rate through an extractor often result in a corresponding decrease in extract recovery. This can occur when the feedstock does not have sufficient residence time within the extractor and/or the increased feedstock volume inhibits proper intermixing between the extraction solvent and the feedstock.

SUMMARY

In general, the present disclosure is directed to an extractor that has a housing that maintains a solvent pool in which solids material being processed is immersed during operation. In some examples, multiple bed decks are arranged in the housing to provide surfaces along which the material being processed travels through the extractor and that defines different extraction stages. For example, the extractor may contain one bed deck positioned at a vertically elevated position relative to another bed deck, thereby defining a drop zone where the solids material passing through the extractor drops under the force of gravity from the vertically elevated bed deck to a lower bed deck.

In some configurations, the extractor is configured with a settling zone. In different applications, the settling zone can be formed by truncating the length of the vertically elevated bed deck relative to all other bed decks in the extractor and/or increasing a distance between an end of the vertically elevated bed deck and a sprocket on the conveyor that travels about the vertically elevated bed deck. For example, the settling zone may be formed by shortening the deck plate closest to solvent outlet relative to the other decks so as to move the drop zone away from solvent inlet. In any configuration, the settling zone may provide increased space and residence time for solids material falling through the drop zone that become entrained in countercurrent solvent flow to drop out of the solvent flow under the force of gravity. This can prevent the solids material from discharging with the solvent through the solvent outlet, increasing the efficiency of the extractor.

In one example, an extractor is described that includes a housing and a plurality of bed decks. The housing has a solvent inlet and a solvent outlet and is configured to maintain a solvent pool in which a solids material being processed is immersed during operation of the extractor. The plurality of bed decks are positioned inside the housing, and each of the plurality of bed decks provide a surface along which the solids material is conveyed during operation of the extractor. The example specifies that at least one of the plurality of bed decks is positioned at a vertically elevated position relative to another of the plurality of bed decks so as to define a drop zone where the solids material drops from the vertically elevated bed deck to a lower bed deck. The example also specifies that the housing defines a settling zone adjacent the solvent outlet.

The details of one or more examples are set forth in the accompanying drawings and the description below. Other features, objects, and advantages will be apparent from the description and drawings, and from the claims.

DETAILED DESCRIPTION

In general, the disclosure relates to liquid-solid countercurrent extraction processes that enable the extraction of one or more desired products from solid material flows. In some examples, an extractor conveys a continuous flow of material from its inlet to its outlet while a solvent is conveyed in a countercurrent direction from a solvent inlet to a solvent outlet. As the solvent is conveyed from its inlet to its outlet, the concentration of extracted liquid relative to solvent increases from a relatively small extract-to-solvent ratio to a comparatively large extract-to-solvent ratio. Similarly, as the solid material is conveyed in the opposing direction, the concentration of extract in the solid feedstock decreases from a comparatively high concentration at the inlet to a comparatively low concentration at the outlet. The amount of time the solid material remains in contact with the solvent within the extractor (which may also be referred to as residence time) can vary, for example depending on the material being processed and the operating characteristics of the extractor, although will typically be within the range of 15 minutes to 3 hours, such as from 1 hour to 2 hours.

Figure 1:
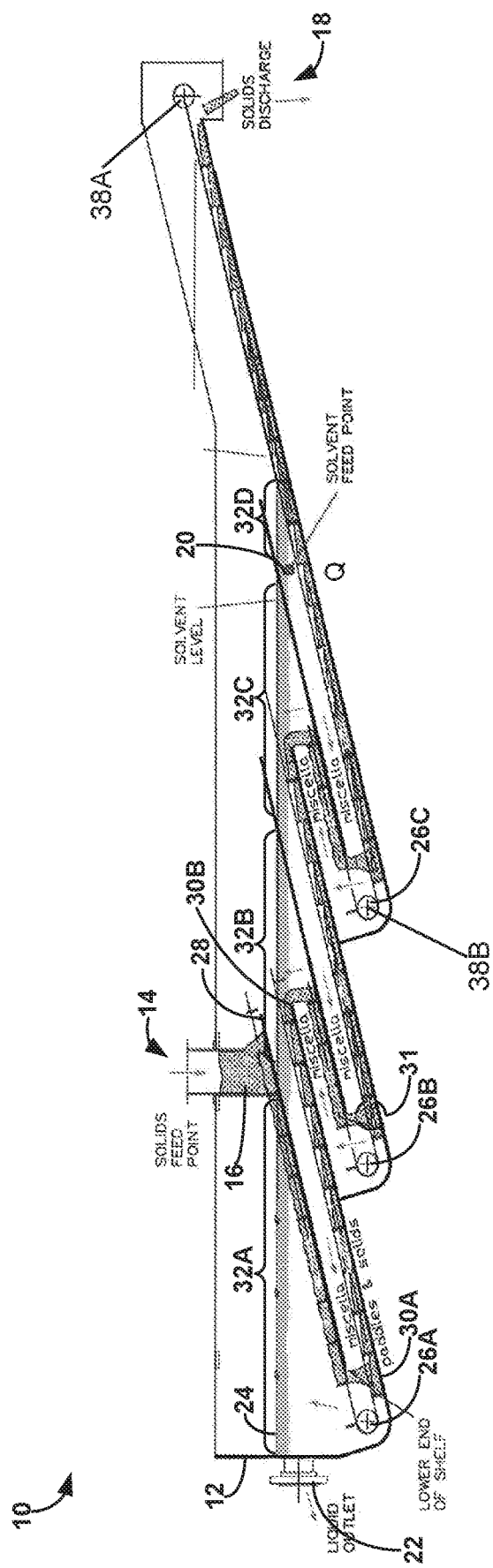
FIG. 1 is a side view of an example extractor that can be used to process a continuous flow of solid material.

FIG. 1 is a side view of an example extractor 10 that can be used to process a continuous flow of solid material carrying one or more compounds desired to be extracted into a solvent. As shown in this example, extractor 10 includes a housing 12 containing one or more extraction stages through which a material being processed travels in a countercurrent direction with an extraction solvent. Housing 12 includes a feed inlet 14 configured to receive a continuous flow of solids material 16 carrying an extract to be extracted within extractor 10. Extractor 10 also includes a feed outlet 18 configured to discharge the solids material 16 after some or all of the extract has been extracted into solvent flowing through the extractor.

To provide a flow of solvent passing through extractor 10, housing 12 also includes a solvent inlet 20 that receives solvent devoid of extract or having a comparatively low concentration of extract. A solvent outlet 22 is provided on a generally opposite end of housing 12 to discharge solvent having passed through extractor 10. As solvent travels through housing 12 from inlet 20 to outlet 22, the solvent flows in a countercurrent direction from the flow of solids material 16 passing through the extractor. The solvent intermixes with solids material 16 within extractor 10, causing the extract carried by the solids material to transfer from the solids material to the solvent. Accordingly, in operation, solvent having a comparatively low concentration of extract enters at inlet 20 while solvent having in increased concentration of extract discharges at outlet 22. Likewise, fresh solids material 16 carrying extract enters at inlet 14 while processed solids material having a reduced concentration of extract is discharged at outlet 18. For example, in instances where solids material 16 is an oil-bearing material, solvent can extract oil out of the solids material forming a miscella (the solution of oil in the extraction solvent) that is discharged through outlet 22.

Extractor 10 can process any desired solids material 16 using any suitable solvent. Example types of solids material 16 that can be processed using extractor 10 include, but are not limited to, oleaginous matter, such as soybeans (and/or soy protein concentrate), rapeseed, sunflower seed, peanuts, cottonseed, palm kernels, and corn germ; oil-bearing seeds and fruits; asphalt-containing materials (e.g., asphalt-containing roofing shingles that include an aggregate material such as crushed mineral rock, asphalt, and a fiber reinforcing); stimulants (e.g., nicotine, caffeine); alfalfa; almond hulls; anchovy meals; bark; coffee beans and/or grounds, carrots: chicken parts; chlorophyll; diatomic pellets; fish meal; hops; oats; pine needles; tar sands: vanilla; and wood chips and/or pulp. Solvents that can be used for extraction of solids material 16 include, but are not limited to, acetone, hexane, toluene, isopropyl alcohol, ethanol, other alcohols, and water.

Extractor 10 can be operated as an immersion extractor in which a pool or reservoir of solvent 24 is maintained in housing 12 to provide a desired solvent level inside the extractor. In such applications, solids material 16 is immersed (e.g., submerged) in the pool of solvent 24 as it moves through extractor 10. In some examples, solids material 16 remains completely submerged in the pool of solvent 24 as it travels through extractor 10, e.g., except when adjacent inlet 14 and outlet 18. In other examples, solids material 16 travels above the pool of solvent 24 at different stages in extractor 10 before falling off the end of a conveyor and dropping back into the pool of solvent. As one example, extractor 10 may be implemented using a Model IV extractor commercially available from Crown Iron Works Company of Minneapolis, Minn.

To contact solids material 16 with solvent inside of extractor 10, the extractor has one or more conveyors that convey the material in a countercurrent direction through the pool of solvent 24. In the configuration of FIG. 1, for instance, extractor 10 has three conveyors 26A, 26B, 26C that convey solids material 16 through the solvent pool 24 contained within housing 12. Solids material 16 can travel along decks or trays 28 positioned inside of extractor 10 to define a bed of material. Each bed deck 28 may define a receiving end 30A and a discharge end 30B. In operation, solids material 16 can drop onto the receiving end 30A of the bed deck 28 and then be conveyed along the bed deck by the conveyor until reaching the discharge end 30B. Upon reaching discharge end 30B, solids material 16 can drop off or fall over the terminal edge of the bed deck, for example, onto a lower bed deck.

The vertical distance separating the discharge end 30B of an upper bed deck 28 from a receiving end 30A of a lower bed deck 28 may provide a mixing or drop zone 32 through which solids material 16 travels. For example, solids material 16 dropping off the discharge end 30B of an upper bed deck 28 can mix and interact with solvent located between the upper bed deck and a lower bed deck in drop zone 31. e.g., as the solids material falls under the force of gravity toward the lower bed deck. A desired extract carried by the solids material 16 can be extracted into the solvent within this drop zone as the solids material intermixes with the solvent within the drop zone. Increasing the number bed decks 28 within extractor 10 and, correspondingly, the number of drop zones between bed decks, can increase the amount of extract recovered from a specific solids material 16 being processed on the extractor.

The conveyors 26A-26C used to convey material along a respective bed deck 28 can push and/or pull the solids material along a top surface of the bed deck. For example, each conveyor may include laterally spaced endless link chains and a plurality of longitudinally spaced flights that extend transversely of the chains. Solids material 26 may be positioned between and dragged by opposed flights, causing the solids material to traverse along a bed deck. In some examples, each conveyor 26A-26C may have an upper sprocket 38A and a corresponding lower sprocket 38B about which an endless conveyor line (e.g., chain attached to flights) travels in rotation.

Extractor 10 can have any suitable number of bed decks 28 arranged in any desired orientation. In the example, of FIG. 1, extractor 10 is illustrated as having six bed decks 28, although the extractor can have fewer bed decks or more bed decks. In addition, in this example, bed decks 28 are arranged at an inclined angle such that the bed decks are alternatingly sloped downwardly and upwardly. Bed decks 28 may be arranged in series with adjacent bed decks being vertically and/or laterally offset from one another to provide adjacent flow pathways over which solids material 26 travels when passing through extractor 10. For example, bed decks 28 may be arranged in parallel to define a serpentine pathway along which solids material 16 is conveyed through pool of solvent 24 between inlet 14 and outlet 18. In operation, solids material 26 may travel along a downwardly sloped bed deck 28 before dropping onto an upwardly sloped lower bed deck, at which point the solids material reverses direction and travels laterally and vertically in an opposed direction from the direction of travel on the upper bed deck.

In the example of FIG. 1, solids material 16 enters extractor 10 via inlet 14 and falls onto a first downwardly sloped bed deck. Conveyor 26A moves solids material 16 from the receiving end of the first downwardly sloped bed deck to the discharge end of the first downwardly sloped bed deck, whereupon the solids material drops off of the deck through a first drop zone onto a first upwardly sloped bed deck. Conveyor 26A moves solids material 16 from the receiving end of this first upwardly sloped bed deck to the discharge end of this bed deck, whereupon the solids material drops off of the deck through a second drop zone onto a second downwardly sloped bed deck. Conveyor 26B moves solids material 16 from the receiving end of the second downwardly sloped bed deck to the discharge end of this bed deck, whereupon the solids material drops off of the deck through a third drop zone onto a second upwardly sloped bed deck. Conveyor 26B moves solids material 16 from the receiving end of this second upwardly sloped bed deck to the discharge end of the bed deck, whereupon the solids material drops off of the deck through a third drop zone onto a third downwardly sloped bed deck. Conveyor 26C moves solids material 16 from the receiving end of the third downwardly sloped bed deck to the discharge end of this bed deck, whereupon the solids material drops off of the deck through a fourth drop zone onto a third upwardly sloped bed deck. Finally, conveyor 26C moves solids material 16 along this final bed deck out of the solvent pool 24 and discharges the processed solids material via outlet 18.

In some examples, the pool of solvent 24 contained within housing 12 is divided into fluidly interconnected sub-pools, e.g., to provide different equilibrium extraction stages. For example, bed decks 28 may provide physical barriers that separate each sub-pool from each adjacent sub-pool and prevent solvent from flowing through the bed deck. In such examples, solvent may flow around the discharge end 30B of each bed deck rather than through the bed deck, allowing the solvent to flow in a countercurrent direction from solids material 16 through extractor 10. Other physical divider structures in addition to or in lieu of bed decks 28 can be used to separate the pool of solvent 24 in different sections.

In the example of FIG. 1, extractor 10 is illustrated as having four solvent pools 32A-32D. Each downwardly sloping bed deck 28 provides a barrier between adjacent pools with adjacent solvent pools being connected at the discharge end of a separating bed deck. In operation, each solvent pool of pools 32A-32D may have a different average extract-to-solvent concentration ratio to provide different stages of extraction. The concentration ratio may progressively increase from a lowest concentration adjacent solvent inlet 20 to a highest concentration adjacent solvent or miscella outlet 22.

Solids material 16 processed in extractor 10 is conveyed out of solvent pool 24 and discharged through outlet 18 via a conveyor. In the configuration of FIG. 1, for instance, conveyor 26C conveys solids material 16 out of pool 24 towards discharge 18. Residual solvent retained by processed solids material 16 can drain under the force of gravity back into solvent pool 24. For this reason, the final bed deck or discharge deck 28 along which solids material 16 travels towards outlet 18 may be sloped upwardly away from solvent pool 24. Solvent carried with solids material 16 out of solvent pool may drain down the sloped bed deck back into the solvent pool, helping to minimize the amount of solvent carried out extractor 10 by the processed solids material being discharged from the extractor.

Solvent rich in extract having passed through extractor 10 discharges from housing 12 via solvent outlet 22. When configured as illustrated in FIG. 1, solvent flows around the terminal end of the first downwardly sloping bed deck 28 onto which incoming solids material 16 is dispensed before flowing upwardly toward solvent outlet 22. As solvent flows around the terminal end of the downwardly sloping bed deck, the solvent can capture solids material falling through first drop zone 31, potentially carrying the solids material out of extractor 10 via solvent outlet 22.

Figure 2:
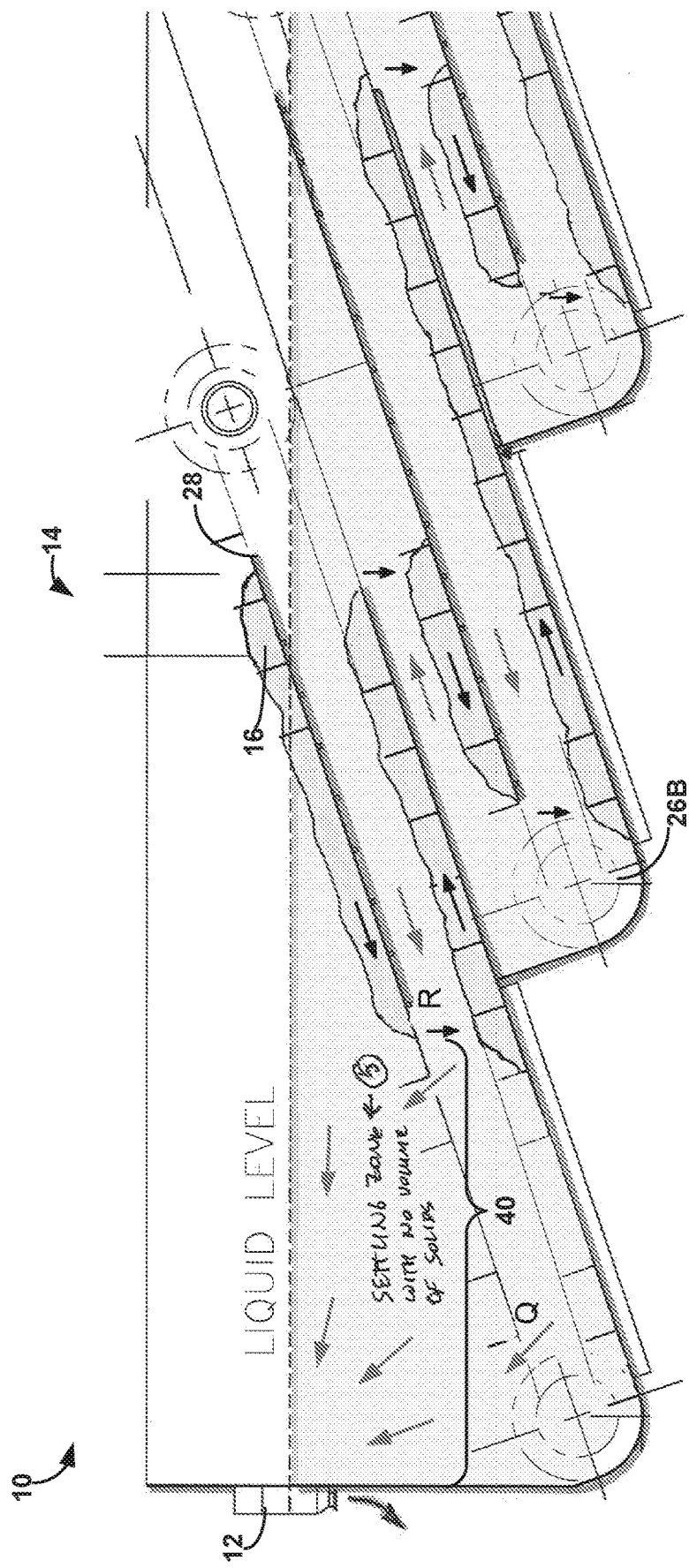
FIG. 2 is a partial side view of an example configuration of the extractor of FIG. 1 showing an example solvent discharge settling zone.

To help prevent incoming solids material from being captured in the solvent flowing upwardly toward solvent outlet 10, extractor 10 can be configured with a solids settling zone located between the first downwardly sloping bed deck (and/or first drop zone 31) and the solvent outlet 22. FIG. 2 is a partial side view of an example configuration of the extractor of FIG. 1 showing an example settling zone adjacent solvent outlet 22. As shown in this example, a settling zone 40 is provided between the first drop zone through which solids material falls from an upper bed deck to a lower bed deck and solvent outlet 22. Settling zone 40 may be a region adjacent solvent outlet 22 through which solids material 16 is not conveyed. For example, settling zone 40 may be a pool or reservoir containing solvent that is located between the first downwardly and upwardly sloping bed decks and solvent outlet 22. Solids material captured in solvent flowing towards solvent outlet 22 can settle within settling zone 40, falling out of the solvent before the solvent discharges extractor 10.

To provide settling zone 40, the bed deck plate from Q to R indicated on FIG. 2 may be removed to allow solid material to fall at point R and allow open space for liquid to flow up and across the entire volume of the liquid remaining in the space. This can provide a low turbulence, low velocity volume of solvent to help settle dust from the liquid. Upon settling, the solid material may fall on the first upwardly sloped bed deck where the conveyor can pull it up the slope and back in to the solids stream. Settling zone 40 can be enlarged, the angle can be changed, or baffles inserted to improve the settling process and provide the cleanest liquid possible at discharge.

In some examples, settling zone 40 is established by making the length of the first bed deck (on which incoming solids material 16 falls) shorter than any of the other bed decks in the extractor. For example, the lower terminal end of the first bed deck (in the direction of travel for solids material 16) can be truncated relative to the other bed decks in the extractor. This can provide a greater distance between the terminal end of the bed deck off of which solids material 16 falls and solvent outlet 22 in which solids material 16 downwardly with gravity through the solvent flowing in a counter-current direction.

Additionally or alternatively, the distance between the lower terminal end of the first bed deck and the lower sprocket (e.g., sprocket 38B for conveyor 26A) can be varied so the distance between the end of the first bed deck and the sprocket is greater than the terminal end of any other bed deck and a corresponding sprocket in the extractor. The distance between the end of the bed deck and sprocket can be increased by shortening the length of the first bed deck (relative to other bed decks) and/or extending the position of the lower sprocket farther from the end of the first bed deck than the distance between any other bed deck and corresponding sprocket. In these latter examples, an additional rail or sprocket (e.g., driven roller or idler roller) can be inserted to support extension of the conveyor.

The size of settling zone 40 may vary, e.g., based on the types of solid material being processed and the size of extractor 10. However, in some examples, the lateral distance between the first drop zone 31 and solvent outlet 22 (designated by reference numeral 40 on FIG. 2) may be at least 0.5 meter, such as at least 1 meter, at least 5 meters, or at least 10 meters. For example, the distance may range from 0.5 meters to 5 meters, such as from 1 meter to 3 meters. Other distance are possible, and the disclosure is not limited in this respect.

Various examples have been described. These and other examples are within the scope of the following claims.

The invention claimed is:

1. An extractor comprising:
    a housing having a feed inlet configured to receive a solid material to be extracted, a solvent inlet, and a solvent outlet, the housing being configured to maintain a solvent pool in which the solid material being processed is immersed during operation of the extractor;
    a plurality of bed decks positioned inside the housing, each of the plurality of bed decks providing a surface along which the solid material is conveyed during operation of the extractor, the plurality of bed decks including a first bed deck positioned closest to the solvent outlet that is vertically elevated relative to a second bed deck to define a drop zone where the solid material drops from a terminal end of the first bed deck to the second bed deck and
    a plurality of conveyors, with one of the plurality of conveyors being associated with each of the plurality of bed decks, each of the plurality of conveyors comprising a lower sprocket and an upper sprocket;
    wherein a distance from the terminal end of the first bed deck to the lower sprocket of one of the plurality of conveyors associated with the first bed deck is greater than a distance from a lower terminal end of each of the other of the plurality of bed decks to the lower sprocket of a corresponding one of the plurality of conveyors, thereby defining a settling zone adjacent the solvent outlet.

2. The extractor of claim 1, wherein the settling zone defines a pool of solvent in which carried solid material is configured to settle out of the solvent.

3. The extractor of claim 1, wherein the first bed deck has a length shorter than lengths of all other of the plurality of bed decks in the extractor.

4. The extractor of claim 1, wherein the first bed deck has a receiving end on which incoming solid material to be processed is deposited from the feed inlet and the terminal end is positioned closer to the solvent outlet than the receiving end.

5. The extractor of claim 1, wherein the first bed deck has a length shorter than a length of the second bed deck.

6. The extractor of claim 1, wherein the settling zone is defined between the terminal end of the first bed deck and a surface of the housing in which the solvent outlet is positioned.

7. The extractor of claim 1, wherein the settling zone has a size effective to allow substantially all solid material falling through the drop zone to fall out of the solvent, thereby preventing the solid material from discharging through the solvent outlet.

8. The extractor of claim 1, wherein a distance from the terminal end of the first bed deck to the solvent outlet is at least 1 meter.

9. The extractor of claim 1, wherein a distance from the terminal end of the first bed deck to the solvent outlet is at least 5 meters.

10. The extractor of claim 1, wherein each of the plurality of conveyors comprises an endless conveyor line extending about the lower sprocket and the upper sprocket.

11. The extractor of claim 10, wherein the endless conveyor comprises a chain attached to flights.

* * * * *